United States Patent
Meyer et al.

(10) Patent No.: US 8,103,015 B2
(45) Date of Patent: Jan. 24, 2012

(54) WIRE-FREE HEADSET, PORTABLE MEDIA PLAYER

(75) Inventors: Rolf Meyer, Wennigsen (DE); Axel Grell, Burgdorf (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 741 days.

(21) Appl. No.: 12/223,343

(22) PCT Filed: Jan. 30, 2007

(86) PCT No.: PCT/EP2007/000761
§ 371 (c)(1),
(2), (4) Date: Aug. 18, 2008

(87) PCT Pub. No.: WO2007/085492
PCT Pub. Date: Aug. 2, 2007

(65) Prior Publication Data
US 2009/0022334 A1    Jan. 22, 2009

(30) Foreign Application Priority Data
Jan. 30, 2006   (DE) .......................... 10 2006 004 342

(51) Int. Cl.
*H04R 1/10* (2006.01)
(52) U.S. Cl. .................................. 381/74; 381/77
(58) Field of Classification Search ............. 381/74, 381/77, 79; 455/41.1, 41.2
See application file for complete search history.

(56) References Cited

U.S. PATENT DOCUMENTS

| | | | |
|---|---|---|---|
| 2002/0039424 A1 | 4/2002 | Watanuki | |
| 2006/0008094 A1 | 1/2006 | Huang et al. | |
| 2006/0193273 A1* | 8/2006 | Passier et al. | 370/310 |
| 2007/0008984 A1* | 1/2007 | Philips et al. | 370/412 |

FOREIGN PATENT DOCUMENTS

| | | |
|---|---|---|
| DE | 694 21 223 | 5/2000 |
| DE | 20 2005 006 249 | 7/2005 |
| DE | 601 07 266 | 11/2005 |
| DE | 10 2004 051 091 | 5/2006 |
| EP | 1 079 555 | 2/2001 |
| EP | 1 196 007 | 4/2002 |
| EP | 1 349 420 | 10/2003 |
| WO | 2005/013639 | 2/2005 |
| WO | 2006/089049 | 8/2006 |

* cited by examiner

*Primary Examiner* — Kevin M Picardat
(74) *Attorney, Agent, or Firm* — Frommer Lawrence & Haug LLP

(57) ABSTRACT

There are proposed wireless headphones which have at least one electroacoustic transducer for the reproduction of audio signals, a receiver for receiving wirelessly transmitted audio data, an intermediate memory for putting the received audio data into intermediate storage, an audio decoding unit and a control unit. The audio data wirelessly received by the receiver are firstly buffered or put into intermediate storage in the intermediate memory. The control unit controls reading of the compressed audio data stored in the intermediate memory so that said data are passed to the audio decoding unit where the compressed audio data are decoded and then outputted by means of the electroacoustic transducers. Wireless transmission is effected at a higher speed than the reproduction of the stored audio signals.

7 Claims, 1 Drawing Sheet

WIRE-FREE HEADSET, PORTABLE MEDIA PLAYER

The present application claims priority from PCT Patent Application No. PCT/EP2007/000761 filed on Jan. 30, 2007, which claims priority from German Patent Application No. 10 2006 004 342.1 filed on Jan. 30, 2006, the disclosure of which is incorporated herein by reference in its entirety.

BACKGROUND OF THE INVENTION

1. Field of the Invention

The present invention concerns wireless headphones, a portable media player and a method of reproducing audio signals.

2. Description of Related Art

Portable media players such as for example MP3 players, minidisk players, portable CD-players and so forth are enjoying ever increasing popularity. In that case audio data compressed such as for example in the form of MP3 data files or uncompressed are stored on a storage medium. The storage medium can be for example a minidisk or a CD. As an alternative thereto the audio data can be stored in a semiconductor memory or on a hard drive. A media player of that kind typically has an audio decoder for decoding the compressed audio data files. The decoded data files are then typically passed by way of an audio output to a wired pair of headphones. As an alternative thereto the data can also be transmitted wirelessly to wireless headphones.

Headphones are also known which have a semiconductor memory for storage of the compressed audio data files and an audio decoder. In that respect however it has proven to be disadvantageous that the power supply of such headphones must provide both the power for audio reproduction and also the power for decoding the compressed audio data.

SUMMARY OF THE INVENTION

The object of the present invention is to provide wireless headphones and a corresponding portable media player which have a reduced power consumption.

That object is attained by wireless headphones as set forth in claim 1, a media player as set forth in claim 2 and a method of reproducing audio data as set forth in claim 3.

Thus there is provided wireless headphones comprising at least one electroacoustic transducer for the reproduction of audio signals, a receiver for receiving wirelessly transmitted audio data, an intermediate memory for the intermediate storage of the received audio data, an audio decoding unit and a control unit. The audio data wirelessly received by the receiver are firstly buffered or put into intermediate storage in the intermediate memory. The control unit controls reading of the compressed audio data stored in the intermediate memory so that those data are passed to the audio decoding unit where the compressed audio data are decoded and then outputted to the electroacoustic transducers. Wireless transmission is effected at a higher speed than the reproduction of the stored audio signals.

The invention also concerns a portable media player. The media player has a transmitter for the wireless transmission of compressed audio data. The media player further has an input unit by way of which a user can control the function of the media player. The media player further has a memory for the storage of compressed audio data and/or a memory card reading unit for reading memory cards. A control unit reads out the data in the memory and/or on a memory card in the memory card reading unit in accordance with the inputs of the user by way of the input unit and forwards those data to the transmitter. The transmitter wirelessly transmits the compressed audio data for example to wireless headphones. In that case transmission takes place at a higher speed than the speed required for the reproduction of the compressed audio data.

The invention also concerns a method of reproducing audio signals in wireless headphones. For that purpose compressed audio data are stored in a memory and wirelessly transmitted to wireless headphones. The transmitted compressed audio data are put into intermediate storage and then decoding or decompression of the compressed audio data takes place. The audio data are then reproduced by way of electroacoustic transducers.

The fact that the compressed audio data are transmitted to the wireless headphones faster than they are read out from the intermediate memory of the wireless headphones means that transmission of the compressed audio files can take place in blocks so that the required wireless transmission section does not have to be active throughout the entire time during which reproduction of the audio signals takes place. Thus the energy consumption of the transmitter in the media player and the receiver in the wireless headphones can be reduced.

Further configurations of the invention are the subject-matter of the appendant claims.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
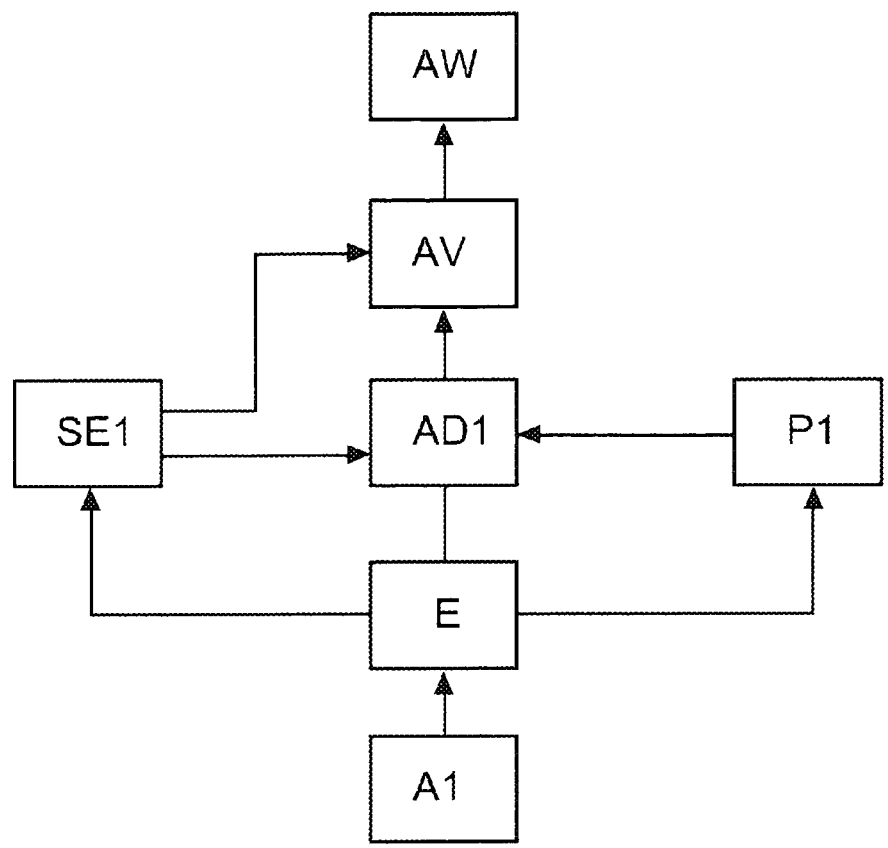
FIG. 1 shows a block diagram of wireless headphones in accordance with a first embodiment of the invention.

FIG. 1 shows a block diagram of wireless headphones in accordance with a first embodiment by way of example. The wireless headphones comprise an antenna A1, a wireless receiver E, an intermediate memory P1, a control unit SE1, an audio decoding unit AD1, an audio amplifier AV and electroacoustic transducers AW. Wirelessly transmitted, preferably compressed audio files such as for example MP3 files, AAC files or the like are received by way of the antenna A1 and the wireless receiver E and put into intermediate storage in the intermediate memory P1. Wireless control signals can also be received by way of the antenna A1 and the receiver E.

On the basis of the wirelessly received control signals the control unit SE1 controls reading of the compressed audio data which are stored in the intermediate memory P1 and which are decoded or decompressed in the audio decoding unit AD1. The decompressed or decoded audio data are passed to an audio amplifier AV where the audio data or audio signals are correspondingly amplified so that they can then be reproduced by way of the electroacoustic transducers AW.

Transmission of the compressed audio data for example from a media player to the wireless headphones is effected at a speed which is greater than the speed required for a reproduction. In other words the time required for transmission of the audio data is shorter than that required for reproduction of the audio data. Accordingly the intermediate memory P1 must be such that compressed audio data can be sufficiently stored or put into intermediate storage. In other words, transmission is effected more quickly than reading out of the data from the intermediate memory. As the transmission speed is greater than the reading-out speed the required compressed audio data can be transmitted to the wireless headphones more quickly than they are read out of the intermediate memory P1. Accordingly the compressed audio data to be transmitted can be transmitted in blocks or bursts so that the wireless transmission section does not have to be active for the entire time during which reproduction of audio signals is effected by way of the electroacoustic transducers AW. The compressed audio files such as for example MP3 files are thus preferably transmitted in blocks and only then decoded in the wireless headphones. It is thus possible to repeat transmission of the block if an error occurs in a block.

The fact that the wireless transmission section does not have to be active the whole time means that the required electrical power is reduced. In addition a plurality of blocks of different contents can be transmitted, that is to say a plurality of compressed audio files can be transmitted together with control signals.

Transmission of the compressed audio data can be effected during reproduction of the audio signals and/or prior to the reproduction.

Figure 2:
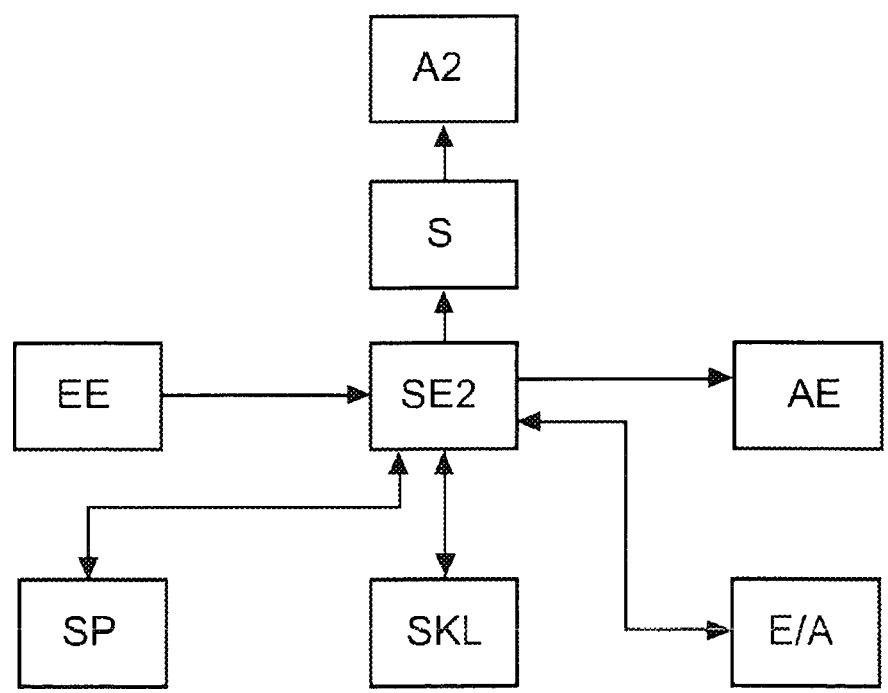
FIG. 2 shows a block diagram of a portable media player in accordance with a first embodiment of the invention.

FIG. 2 shows a block circuit diagram of a media player in accordance with a first embodiment. The media player has an antenna A2, a transmitter S, a control unit SE2, an input unit AE, a memory SW and/or a memory card reading unit SKL, a display unit AE and an input/output interface E/A. Compressed audio files such as for example MP3 files are stored in the memory SP2 and/or in a memory card in the memory card reading unit SKL. BY means of the input unit EE a user can select some of the stored compressed audio files for reproduction in the wireless headphones of FIG. 1. On the basis of that selection the control unit SE2 reads the corresponding audio data out of the memory SP and/or out of the memory card in the memory card reading unit SKL and passes them to the transmitter S. By means of the wireless transmitter S and the antenna A2 those selected compressed audio files are transmitted to the wireless headphones DKH as shown in FIG. 1. Optionally the media player can have a display device AD on which the audio files in the memory SP and/or on a memory card are displayed so that a user can make a selection by means of the input unit EE. The media player can also optionally have an input/output interface E/A, by means of which the media player can communicate with further external devices.

As already described above transmission of the selected compressed audio files can take place more quickly than reading-out of audio data stored in the intermediate memory P1 in the wireless headphones. Transmission of the selected compressed audio files can take place in blocks so that the wireless transmission section between the wireless transmitter S and the wireless receiver E in FIG. 1 does not have to be activated the entire time during which the audio signals are outputted by way of the electroacoustic transducers AW.

By means of the input unit EE a user can select individual audio files or a playback list. When a playback list has been selected the control unit SE2 controls a transmission of the compressed audio files in accordance with the playback list to the wireless headphones. In that case transmission can be effected in such a way that the playback list or the corresponding compressed audio files are firstly transmitted and stored in the intermediate memory P1.

The media player described with reference to FIG. 2 represents a portable electronic device which for example can be implemented in the form of a cellular telephone, a personal digital assistant or PDA, or a remote control with additional memory. The memory SP can be implemented in the form of a semiconductor memory and/or a hard drive. By way of example a USB stick, a memory stick, a Compact Flash, an SD card etc can be read out by means of the memory card reading unit.

The wireless transmission section between the transmitter S and the receiver E can be based for example on a Bluetooth protocol, a WLAN protocol or similar wireless communication protocols. As an alternative thereto it is also possible to use a high-frequency transmission section or an infrared transmission section.

In accordance with a second embodiment of the invention the media player additionally has an audio decompression unit AD2, by means of which decompression of the compressed audio files to be transmitted is effected prior to transmission. Accordingly audio files are then transmitted, in place of the compressed audio files. That audio decoding unit AD2 can thus serve to carry out complete decoding of the encoded audio signals or audio files. In addition decoding of the compression audio files can be effected by means of the audio decoding unit AD2 in the media player, while further encoding of the audio data is effected prior to the transmission, such further encoding being specifically matched to the corresponding wireless transmission section. In this embodiment the audio decoding unit AD1 of the wireless headphones DKW can be less computing-intensive in design.

As an alternative to the above-described first embodiment the wireless receiver E, the intermediate memory P1, the audio decoding unit AD1 and the control unit SE1 can be arranged in an external unit or an autonomous unit which can be connected to the wireless headphones or a conventional headphone set.

The above-described memories or intermediate memories can be in the form of holographic memories.

Although compressed audio data are transmitted to the wireless headphones in the above-described embodiments it is also possible to transmit non-compressed audio data to the wireless headphones. Accordingly the portable media player can not only send compressed audio data but can also send non-compressed audio data, that is to say the media player can be operated in a first mode (transmission of the compressed audio data) and a second mode (transmission of the non-compressed audio data). A corresponding consideration also applies to the wireless headphones. Switching over between the first and second modes can be initiated by the media player or the headphones.

The compressed audio data can represent for example files of the following formats: AC-3, AAC (MPEG-2, MPEG-4), ATRAC, DTS, MP2, MP3, Musepack, Ogg, Vorbis, WMA or the like.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A wireless headphone device comprising:
a portable media player including:
   a transmitter for wirelessly transmitting compressed audio data;
   a memory for storing compressed audio data and/or a memory reading unit for reading memory modules; and
   a control unit (1) for reading the compressed audio data out of the memory or by means of the memory module reading unit, and (2) for controlling the wireless transmission of the read-out compressed audio data;
a wireless headphone comprising:
   at least one electroacoustic transducer for the reproduction of audio signals;
   a receiver for wirelessly receiving transmitted compressed audio data at a first speed;
   an intermediate memory for putting the received compressed audio data into intermediate storage;
   an audio decoding unit for decoding compressed audio data stored in the intermediate memory; and
   a control unit for controlling the reproduction of the decoded audio data and for controlling reading-out of the audio data stored in the intermediate memory at a second speed;
wherein the first speed is greater than the second speed;
wherein the compressed audio data is transmitted together with control signals; and
wherein the control unit is adapted to control the reading of the compressed audio data according to the received control signals.

2. The wireless headphone device as set forth in claim 1;
wherein the receiver is adapted to receive the transmitted compressed audio data in bursts.

3. The wireless headphone device as set forth in claim 1;
wherein the transmitter is adapted to transmit compressed audio data in bursts.

4. The wireless headphone device as set forth in claim 1;
wherein the media player further comprises an audio decompressing unit which is adapted to decompress the transmitted compressed audio data; and
wherein before the transmission of the audio data, a further encoding of the audio data is performed which is specially adapted to a wireless transmission path.

5. The wireless headphone device as set forth in claim 2;
wherein the media player further comprises an audio decompressing unit which is adapted to decompress the transmitted compressed audio data; and
wherein before the transmission of the audio data, a further encoding of the audio data is performed which is specially adapted to a wireless transmission path.

6. The wireless headphone device as set forth in claim 3;
wherein the media player further comprises an audio decompressing unit which is adapted to decompress the transmitted compressed audio data; and
wherein before the transmission of the audio data, a further encoding of the audio data is performed which is specially adapted to a wireless transmission path.

7. A method of reproducing audio data comprising the steps:
   transmitting compensated audio data to wireless headphones;
   putting the transmitted compressed audio data into intermediate storage in the wireless headphones;
   reading out the compressed audio data which have been put into intermediate storage, decoding the audio data which have been put into intermediate storage; and
   reproducing the decoded audio data;
wherein the speed of the wireless transmission is greater than the reading-out speed required for reproduction in the wireless headphones;
wherein the compressed audio data is transmitted together with control signals; and
wherein the control unit is adapted to control the reading of the compressed audio data according to the received control signals.

* * * * *